J. R. CANCIO.
HORSESHOES.
No. 190,740.
Patented May 15, 1877.
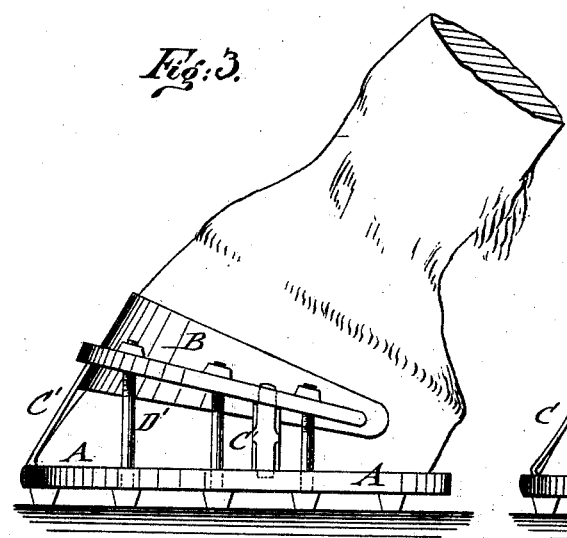
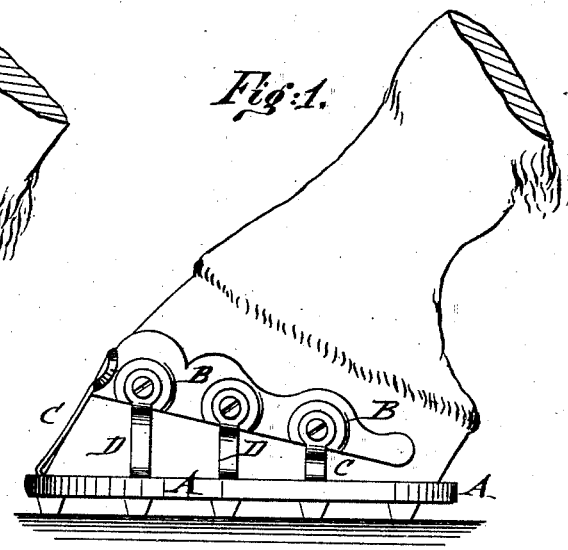
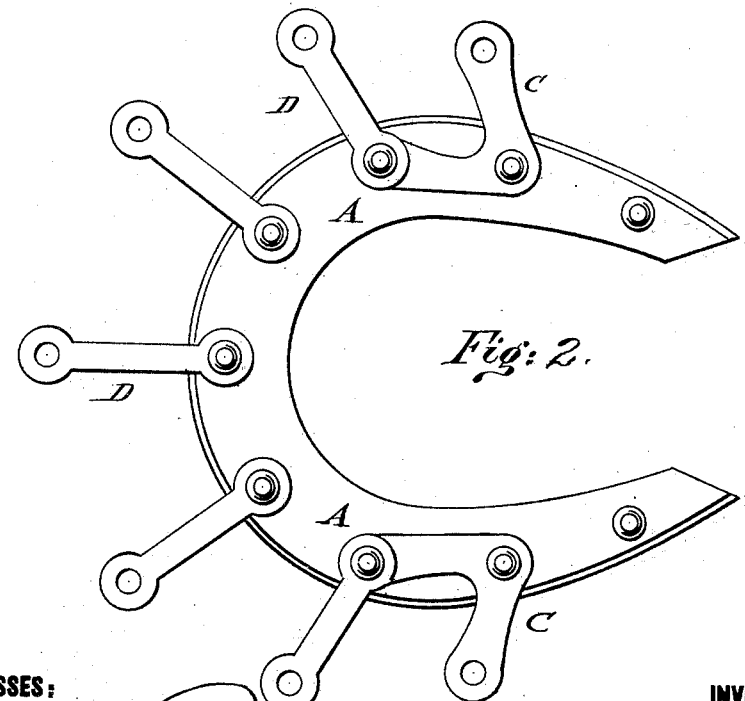
WITNESSES:
INVENTOR:
J. R. Cancio.
BY
ATTORNEYS.

UNITED STATES PATENT OFFICE.

JOSÉ R. CANCIO, OF POL, SPAIN.

IMPROVEMENT IN HORSESHOES.

Specification forming part of Letters Patent No. 190,740, dated May 15, 1877; application filed March 24, 1877.

*To all whom it may concern:*

Be it known that JOSÉ R. CANCIO, of Pol, in the Province of Lugo, Spain, have invented a new and useful Improvement in Attaching Horseshoes, of which the following is a specification:

The invention will first be described in connection with the drawing, and then pointed out in the claim.

In the accompanying drawing, Figure 1 is a side elevation of my improved attachment. Fig. 3 is a side view of a modification thereof, and Fig. 2 is a plan view of the shoe and fastenings without the band.

Similar letters of reference indicate corresponding parts.

By reference to the drawing, A represents a horseshoe, which is applied to the hoof by means of a metallic band, B, of a suitable width and strength, which may be lined with leather or other material at the under side, so as to produce a tight frictional contact with the hoof.

The band B encircles the greater part of the hoof, as shown in Fig. 1, and is secured to the same by side and front stays C, which support the band by being socketed, riveted, screwed, or otherwise attached to the band and shoe. The band is tightly fastened to the hoof by the straps D, which are riveted to the calks at the top of the shoe, and secured by eyes and fastening-screws at their upper ends into corresponding recesses of the band, as shown in Fig. 1.

In the modification shown in Fig. 3 of drawing the attachment is tightly fastened to the animal's hoof by screw-bolts D', which are welded to the calks, pass through holes in the shoe and band, and are secured to a central flange or rib of the said band by nuts.

The calks are replaced when worn, so that the shoe and band may be used for considerable length of time before new ones have to be substituted.

When the band is properly fitted to the hoof and tightly connected thereto, and to the shoe, a firm attachment of the shoe is obtained, that exerts no injurious influence upon the hoof, as the same is not split up by nails, and which may be conveniently taken off and replaced for recalking and refitting.

Having thus described my invention, I claim as new and desire to secure by Letters Patent—

The combination of the shoe A and band B, connected with each other by front and lateral straps C D, which are riveted to the calks and secured by eyes and fastening-screws at their upper ends to the band, substantially as described.

JOSÉ R. CANCIO.

Witnesses:
    PAUL GOEPEL,
    MARTIAL TUSQUÉ.